United States Patent [19]

Poppe et al.

[11] 4,035,528

[45] July 12, 1977

[54] COATING SUBSTRATE WITH POLYOLEFIN/POLYCARBONAMIDE POWDER COMPOSITIONS

[75] Inventors: Wassily Poppe, Lombard; Ivor R. Fielding, Naperville, both of Ill.

[73] Assignee: Standard Oil Company (Indiana), Chicago, Ill.

[21] Appl. No.: 637,528

[22] Filed: Dec. 4, 1975

Related U.S. Application Data

[62] Division of Ser. No. 483,923, June 28, 1974, Pat. No. 3,968,280.

[51] Int. Cl.² .................. B05D 3/02; B05D 3/08
[52] U.S. Cl. .................. 427/195; 215/DIG. 6; 427/375
[58] Field of Search ........... 427/27, 375, 195, 314; 428/35, 332, 334, 335, 336, 435, 441, 458, 461, 474, 523; 260/18 N, 857 L; 215/DIG. 6, 1 C

[56] References Cited

U.S. PATENT DOCUMENTS

| | | | |
|---|---|---|---|
| 2,279,774 | 4/1942 | Bolton | 427/375 |
| 2,302,332 | 11/1942 | Leekley | 427/55 |
| 2,335,930 | 12/1943 | Freeland et al. | 427/375 |
| 2,844,489 | 7/1958 | Gemmer | 427/190 |
| 3,093,255 | 6/1963 | Mesrobian et al. | 215/1 C |
| 3,136,735 | 6/1964 | Stott | 260/857 L |
| 3,177,092 | 4/1965 | Meyers et al. | 427/375 |
| 3,178,049 | 4/1965 | Cottet | 215/DIG. 6 |
| 3,397,816 | 8/1968 | Ess et al. | 428/474 |
| 3,441,469 | 4/1969 | Fitko et al. | 428/418 |
| 3,621,075 | 11/1971 | Cleary | 260/857 L |
| 3,822,227 | 7/1974 | Hermann et al. | 260/857 L |
| 3,873,667 | 3/1975 | Preto et al. | 260/857 L |
| 3,932,368 | 1/1976 | McConnell et al. | 427/27 |

FOREIGN PATENT DOCUMENTS

740,501 8/1966 Canada .................. 260/857 L

*Primary Examiner*—Ronald H. Smith
*Assistant Examiner*—Sadie L. Childs
*Attorney, Agent, or Firm*—William H. Magidson; Arthur G. Gilkes; William T. McClain

[57] ABSTRACT

Polyolefin/polycarbonamide powder compositions suitable for the production of continuous coatings on substrates such as glass or metal which can be deposited on a substrate and then fused to the substrate at a temperature of about 190° to 230° C.

5 Claims, No Drawings

COATING SUBSTRATE WITH POLYOLEFIN/POLYCARBONAMIDE POWDER COMPOSITIONS

This is a division of applicationn Ser. No. 483,923, filed June 28, 1974 and now U.S. Pat. No. 3,968,280.

This invention relates to coating compositions comprising a polyolefin and a polycarbonamide and articles coated therewith. More particularly this invention relates to coating compositions comprising polypropylene and a polycarbonamide of an aliphatic dicarboxylic acid having at least 18 carbon atoms.

Coating compositions have been applied to substrates from liquid vehicles such as aqueous emulsions and organic solutions. With the advent of more and more stringent environmental protection laws, there has been considerable interest in substantially 100% solids coating compositions, such as powder coatings, to avoid volatilization of organic solutions and sewering of aqueous residues. Generally speaking, some powder coatings, such as those based on condensation polymers (polyamides, epoxides, etc.), have the drawback of high raw material cost while others, such as those based on polyolefins have functional drawbacks. For example, polyolefins, particularly stabilized polypropylene, tend to have poor adhesive strength to substrates such as glass and steel and/or poor flexibility and/or poor impact resistance, poor clarity, etc. This is unfortunate since the beverage and food industries are interested in low cost exterior coatings for glass bottles to prevent flying glass, particularly from explosion of carbonated beverage bottles, and low cost can linings. Attempts by us to upgrade polyolefin coating compositions by using mixtures of polyolefin and higher priced condensation polymers have not been very successful till now because of the poor compatibility of polyolefins with the condensation polymers. Accordingly, there is a need for improved 100% solids polyolefin coating compositions.

The general object of this invention is to provide improved polyolefin coating compositions. A more specific object of this invention is to provide improved polypropylene powder coating compositons. Other objects appear hereinafter.

In one aspect this invention is a composition comprising a polyolefin and a polycarbonamide of a dicarboxylic acid having at least 18 carbon atoms.

In a second aspect this invention is a substrate bearing a layer comprising a polyolefin and polycarbonamide of a dicarboxylic acid having at least 18 carbon atoms.

In a third aspect this invention is a glass bottle bearing an exterior layer or coating of a composition comprising a polyolefin and a polycarbonamide of a dicarboxylic acid having at least 18 carbon atoms.

In a fourth aspect this invention is a metal substrate having a layer or coating of a composition comprising a polyolefin and a polycarbonamide of a dicarboxylic acid having at least 18 carbon atoms.

We have now found that the objects of this invention can be attained with coating compositions comprising from about 25 to 90 parts by weight polyolefin and correspondingly 75 to 10 parts by weight of a polycarbonamide of a dicarboxylic acid having at least 18 carbon atoms, i.e., a weight ratio of polyolefin to polycarbonamide of 1:3 to 9:1. Unlike the typical nylon 66 and nylon 6 polymers, the polycarbonamides of this invention have excellent compatability with polyolefin polymers. Powder blends of the preferred polycarbonamides of this invention and polypropylene powder can be coated on the substrate and fused. The polymers are so compatible that during fusion, the polymers form a blend having substantially the same properties as a premelted blend of the two polymers. Unlike the polyolefin polymers containing low concentrations of conventional condensation polymers (e.g. nylon 66 and nylon 6), the polyolefin coatings of this invention have excellent adhesion to substrates (particularly glass and steel can blanks), relatively good flexibility and impact resistance. In general, the higher the concentration of the polycarbonamide, the better the clarity of the polymer coating.

In somewhat greater detail, the polyolefins useful in this invention include resinous polymers of propylene and/or ethylene such as substantially crystalline homopolymeric polypropylene, high density polyethylene, propylene-ethylene block, random or multi-segment copolymers, etc. Of these, resinuous polymers of propylene containing at least 75% by weight propylene and particularly substantially crystalline homopolymeric polypropylene are preferred because they have a higher melting point and are not sticky at slightly elevated temperatures. For use in powder coating, the polyolefins must have a particle size of 250 microns diameter or less, preferably 150 microns or less.

The polycarbonamides useful in this invention are condensation products of long chain fatty dicarboxylic acids (or acid derivatives) having at least 18 carbon atoms up to about 72 carbon atoms and polyamines having two primary amino groups. The long chain of the dicarboxylic acid moiety of the polycarbonamide gives the polycarbonamide a sufficient hydrocarbon or fatty property that these polymers are compatible with polyolefins over a broad range of proportions. Suitable dicarboxylic acids include alpha, omega-dicarboxyhexadecane, alpha, omega-dicarboxytetracosane, the so-called dimmer acids, etc. Suitable polyamines containing at least two primary amino groups include hexamethylene diamine, octamethylene diamine, decamethylene diamine, diethylene triamine, etc.

The preferred polycarbonamides useful in this invention are based on the so-called dimer acids. Of course Crystalclad-EP-2100, a dimer acid/hexamethylene diamine polyamide recommended for coating pop bottles, is preferred because it is available in small particle form and does not have to be cryogenically milled to obtain a useful particle size.

As indicated above, the coating compositions comprise a weight ratio of polyolefin to polycarbonamide of 1:3 to 9:1, preferably 5:1 to 2:3. From an economic point of view, it is desirable to use as little polycarbonamide as possible because of the relatively high cost of this material. However, the optimum concentration varies with end use. For example, mixtures of polypropylene and the preferred polycarbonamides containing at least about 1 part by weight polycarbonamide per each four parts by weight stabilized polypropylene have excellent flexibility and adhesion to Bonderite Steel and Bonderite 721 Aluminum while at least one part by weight polycarbonamide per each 2.5 parts by weight stabilized polypropylene is necessary to obtain approximately the same flexibility and adhesion to glass bottles.

The polyolefin/polycarbonamide compositions of this invention can be applied to any relatively high melting substrate including metals, such as copper, steel, aluminum, lead, zinc, etc. or inorganic polymers, such as glass, ceramic, etc. For example, the composition can be applied to metal blanks (steel, aluminum, tin plated steel, etc.) prior to fabrication into containers or applied to the exterior of glass containers. In the former use, the polyolefin/polycarbonamide coating serves as an excellent liner, particularly where the metal blanks are for producing cans for foods. In the latter use, the exterior coating reduces dangers from flying glass and is particularly useful for carbonated beverage bottles.

The polyolefin/polycarbonamide compositions can be applied to the exterior of preheated glass botles by dipping the bottles in a fluid bed of the polymers. The bottles are removed from the fluid bed and baked for 4 to 10 minutes at 190° to 230° C. Below 190° C. the coating tends to orange peel while above about 230° C., the polypropylene decomposes and the coating yellows. A thinner continuous coating can be applied by electrostatically depositing a mixture of polyamide and polypropylene particles of 250 microns diameter or less, preferably 150 microns or less, following by heat fusing the deposited particles at 190° to 230° C. to form a continuous coating. The fusion temperature in both processes is critical for the reasons set forth above. In general, the electrostatic process is preferred for depositing continuous coating on metals, particularly on the inside of metal can blanks.

If the powder particles are more than 250 microns, there is a tendency for the coating to orange peel and for particles to clog the spray nozzles. Further, a longer heat fusion time is required for particles over 250 microns which increases the possiblity of degration of polymer and the development of undesirable color. In general, the smaller the particle size the better the coating with optimum results at 150 microns diameter or less.

The polymer coating can range from about .25 to 20 mils depending upon the substrate. For metal can blanks used to package foods, the layer should be about 0.25 to 2 mils preferably 0.5 to 1 mil while for drum linings 5 to 10 mils is preferred. Glass containers should have a coating thickness of at least 1 mil and preferably 6 to 8 mils to contain broken glass.

The adhesion of the polyolefin/polycarbonamide coatings of this invention can be enhanced by compounding the polyolefin with from 0.1 to 2 parts by weight of a zinc salt of a fatty acid per 100 parts by weight polyolefin. The zinc salt seems to act as a curing agent and permits optimum cure and adhesion to take place at a somewhat lower cure temperature. Suitable zinc salts include zinc stearate, zinc palmitate, zinc oleate, etc.

The following examples are merely illustrative and should not be construed as limiting the scope of the invention.

The tests referred to in the examples were carried out as follows:

To measure adhesion on a metal surface an X or a cross-hatch network was scribed in the cured powder coating. No. 610 Scotch Tape was placed over the scribed area and smoothed until intimate, uniform contact was made with the coating. The tape was pulled off with a rapid, vertical motion. The tape and metal substrate were examined for coating removal. Adhesion was the percent of the film which was not removed from the metal surface.

The adhesion to glass bottles was the percent of the film which remained intact on the glass surface after the coated bottle was aged overnight. Air pockets between the film and the glass surface were considered an adhesion failure.

Flexibility of the coating was determined using a conical mandrel. The coated metal panel was bent through about a 180° arc in about 15 seconds on a conical mandrel. The coating was examined for cracks and loss of adhesion. The distance of cracking along the bend was measured with the results being percent elongation. Possible cracks, as evidenced by whitening of the coating were considered as a sign of insufficient flexibility.

Film coverage or the continuous nature of the coating on metal was determined by immersing the coated metal strip for two minutes in a copper sulfate solution composed of 70 parts distilled water, 20 parts $CuSO_4.5H_2O$, and 10 parts 37% HCl. The coating was examined for areas of red copper deposits, indicating incomplete coverage.

EXAMPLE I

Ninety-five grams of unstabilized homopolymeric crystalline polypropylene having an average molecular weight of 380,000 sieved through a 60 mesh screen (U.S. Standard Sieve Series, 250 micron opening), was stabilized by addition to 5 grams of butylated-hydroxytoluene, dissolved in 300 grams chloroform. The composition was stirred, chloroform allowed to evaporate off in a hood, and the dry polymer composition placed in a vacuum oven at 60° C. overnight to remove all traces of chloroform and ball-milled eight hours.

One gram of the stabilized homopolymer prepared in the preceding paragraph was mixed with 29 grams of the unstabilized crystalline polypropylene which had been sieved through a 60 mesh screen and 20 grams of a polyamide of a dimer acid-hexamethylene diamine copolymer (Crystal-clad-EP-2100) having a particle size distribution of 20% by weight under 10 microns diameter, 50% by weight between 10 to 40 microns diameter and 30% by weight between 40 to 100 microns diameter. The composition was blended in a one-liter glass Waring blender and applied to CCO steel panels (chrome-chrome oxide treated) with a EHP-600 DeVilbiss electrostatic powder spray system PFT-420 micro-feed powder cup and cured at 200° C. for 2 minutes prior to testing. Formulations containing different polyolefin polymers, different ratios of polyolefin to polycarbonamide and various additives were prepared and applied to different substrates in essentially the same manner. The results are set forth in Table I below:

TABLE I

| Wt. Ratio of Polyolefin to Polycarbonamide | Adhesion Cross-Hatch | Adhesion Scribed "X" | Film Coverage | Mandrel Test (% Elongation) |
|---|---|---|---|---|
| 1:0 | 2% | 1% | pass | 12% |
| 9:1 | 3% | 0% | pass | 32% |
| 4:1 | 0% | 0% | pass | 32% |
| 7:3 | 5% | 10% | pass | 19% |
| 3:2 | 38% | 26% | pass | 23% |
| 1:1 | 99% | 99% | pass | 33% |

The above data clearly shows that as the concentration of polycarbonamide increases the adhesion and flexibility of the continuous coating increases.

EXAMPLE II

Example I was repeated except that the composition contained 0.5 parts by weight zinc stearate per 100 parts by weight total polymer. The results are set forth below in Table II:

TABLE II

| Wt. Ratio of Polyolefin to Polycarbonamide | Adhesion Cross-Hatch | Adhesion Scribed "X" | Film Coverage | Mandrel Test (% Elongation) |
|---|---|---|---|---|
| 1:0 | 0% | 0% | pass | 3% |
| 4:1 | 32% | 33% | pass | 9% |
| 7:3 | 46% | 52% | pass | 7% |
| 3:2 | 100% | 100% | pass | 33% |

The above data illustrates that zinc salts of fatty acid can be used to reduce the concentration of polycarbonamide without loss of properties.

EXAMPLE III

Example I was repeated except that unstabilized crystalline polypropylene was used. The results are set forth below in Table III:

TABLE III

| Wt. Ratio of Polyolefin to Polycarbonamide | Adhesion Cross-Hatch | Adhesion Scribed "X" | Film Coverage | Mandrel Test (% Elongation) |
|---|---|---|---|---|
| 1:0 | 98% | 100% | pass | 3% |
| 9:1 | 100% | 100% | pass | 9% |
| 4:1 | 100% | 100% | pass | 32% |

The above data illustrates that substantially less polycarbonamide is necessary to improve the physical properties of unstabilized polypropylene coatings on CCO Steel as compared to the stabilized polymer.

EXAMPLE IV

Example I was repeated except that the composition contained 0.5 parts by weight zinc stearate per 100 parts by weight total polymer and tin plated steel panels were used as the substrate. The results are set forth below in Table IV:

TABLE IV

| Wt. Ratio of Polyolefin To Polycarbonamide | Adhesion Cross-Hatch | Adhesion Scribed "X" | Film Coverage | Mandrel Test (% Elongation) |
|---|---|---|---|---|
| 1:0 | 5% | 2% | pass | 3% |
| 7:3 | 50% | 88% | pass | 5% |
| 3:2 | 98% | 98% | pass | 10% |
| 1:1 | 100% | 100% | pass | 14% |

EXAMPLE V

Example I was repeated using a stabilized ehtylene-propylene copolymer (96% propylene) having a 450,000 average molecular weight, a particle size under 60 mesh (U.S. Standard Sieve Series) and 0.1% by weight butylatedhydroxytoluene with Bonderite 1000 steel panels. The results are set forth below in Table V:

TABLE V

| Wt. Ratio of Polyolefin to Polycarbonamide | Adhesion Cross-Hatch | Adhesion Scribed "X" | Film Coverage | Mandrel Test (% Elongation) |
|---|---|---|---|---|
| 1:0 | 100% | 100% | pass | 3% |
| 4:1 | 100% | 100% | pass | 3% |
| 3:2 | 100% | 100% | pass | 13% |

EXAMPLE VI

Example I was repeated using stabilized and unstabilized crystalline polypropylene. The polymer was sprayed on the exterior of preheated 8 oz. glass botles, cured at 200° C. for 5 minutes, air cooled for four minutes and water quenched. The results are set forth below in Table VI.

TABLE VI

| Wt. Ratio of Polyolefin to Polycarbonamide | %*BHT | Surface Finish | Amount of Film Adhering to Glass |
|---|---|---|---|
| 1:0 | — | smooth; Hazy; Mottled | 33% |
| 9:1 | — | Smooth; Hazy | 50% |
| 4:1 | — | Smooth; Hazy | 95–100% |
| 7:3 | 0.1 | Smooth; Slight Haze | 100% |
| 3:2 | — | Slight orange peel; Slight haze | 100% |
| 1:1 | — | Smooth; Slight haze | 100% |
| 1:1 | 0.1 | Orange peel; Slight haze | 100% |

*BHT - stands for butylatedhydroxtoluene.

EXAMPLE VII

Example VI was repeated using the stabilized ethylene-propylene copolymer employed in Example V. The results are set forth below in Table VII.

TABLE VII

| Wt. Ratio Polyolefin to Polycarbonamide | Surface Finish | Amount of Film Adhering to Glass |
|---|---|---|
| 4:1 | Smooth; Slight Haze | 95% |
| 7:3 | Smooth; Slight Haze | 95% |
| 3:2 | Smooth; Slight Haze | 100% |
| 1:1 | Slight Orange Peel; Slight Haze | 100% |

EXAMPLE VIII

This example illustrates fluidized bed coating of Bonderite 1000 steel panels. The bonderite steel panels were preheated at 200° C. for 2 minutes and immersed in an Armstrong Vibro-Fluidizer Model C fluidizer containing a 1:1 weight ratio of stabilized polypropylene to polycarbonamide used in Example I. The coated panels were baked 3 minutes at 200° C., air cooled, and aged over the weekend prior to testing. Test results were as follows:

Film Thickness - 1.5 mil
Cross-hatch Adhesion - 100%
Scribed X Adhesion - 100%
Film Coverage - no red Cu deposits
Mandrel Test - no Cu deposits on bend.
Water Pasteurization Test - adhesion remained 100%.

We claim:

1. The method of forming a substrate bearing a layer comprising from about 25 to 90 parts by weight of a polyolefin and from about 75 to 10 parts by weight of a polycarbonamide of a dicarboxylic acid having at least 18 carbon atoms, which comprises applying a composition comprising from about 25 to 90 parts by weight of polyolefin particles and from about 75 to 10 parts by weight of particles of a polycarbonamide of a dicarboxylic acid having at least 18 carbon atoms to a substrate and fusing the polymer particles by heat at a temperature of about 190° to 230° C.

2. The process of claim 1 wherein said substrate is a metal substrate and the layer is from about 0.25 to 20 mils.

3. The method of claim 1 wherein said substrate is a glass bottle.

4. The method of claim 1 wherein said polyolefin comprises a resinous polymer of propylene containing at least 75 percent by weight propylene.

5. The process of claim 4 wherein said resinous polymer of propylene and said polycarbonamide both have a particle size of 250 microns diameter or less.